United States Patent
Gu et al.

(10) Patent No.: US 10,339,304 B2
(45) Date of Patent: Jul. 2, 2019

(54) SYSTEMS AND METHODS FOR GENERATING TRIPWIRE FILES

(71) Applicant: Symantec Corporation, Mountain View, CA (US)

(72) Inventors: Lei Gu, Bedford, MA (US); Ilya Sokolov, Boston, MA (US); Matt Boucher, Merrimack, NH (US)

(73) Assignee: Symantec Corporation, Mountain View, CA (US)

(*) Notice: Subject to any disclaimer, the term of this patent is extended or adjusted under 35 U.S.C. 154(b) by 169 days.

(21) Appl. No.: 15/070,523

(22) Filed: Mar. 15, 2016

(65) Prior Publication Data
US 2017/0270293 A1  Sep. 21, 2017

(51) Int. Cl.
| G06F 21/54 | (2013.01) |
| G06F 21/55 | (2013.01) |
| G06F 21/56 | (2013.01) |
| H04L 29/06 | (2006.01) |

(52) U.S. Cl.
CPC ............ G06F 21/54 (2013.01); G06F 21/554 (2013.01); G06F 21/566 (2013.01); G06F 21/568 (2013.01); H04L 63/1491 (2013.01); G06F 2221/034 (2013.01)

(58) Field of Classification Search
CPC .......... G06F 21/50; G06F 21/52; G06F 21/54; G06F 21/55; G06F 21/554; G06F 21/56; G06F 21/566; G06F 21/568; G06F 21/552; G06F 21/556; H04L 63/14;
(Continued)

(56) References Cited

U.S. PATENT DOCUMENTS

| 8,549,643 | B1 | 10/2013 | Shou |
| 9,483,644 | B1 * | 11/2016 | Paithane ........... G06F 17/30144 |
| 9,992,225 | B2 * | 6/2018 | Kolton ................ H04L 63/1491 |

(Continued)

OTHER PUBLICATIONS

Meera Belur; Tripwire: A File System Integrity Checker for Intrusion Detection, Jan. 1, 2002 (Jan. 1, 2002), XP055351134, Received from the Internet: URL: http://www.cs.sjsu.edu/faculty/stamp/CS265/projects/papers/tripwire.doc [retrieved on Mar. 2, 2017].

*Primary Examiner* — Shanto Abedin
*Assistant Examiner* — Adrian Stoica
(74) *Attorney, Agent, or Firm* — FisherBroyles, LLP

(57) ABSTRACT

A computer-implemented method for generating tripwire files may include (1) generating an initial tripwire file according to an initial tripwire generation calculation, the initial tripwire file configured such that modification of the initial tripwire file triggers investigation of a security breach, (2) generating a subsequent tripwire file according to a subsequent tripwire generation calculation, the subsequent tripwire generation calculation differing from the initial tripwire generation calculation along at least one dimension, (3) receiving automated feedback that indicates whether at least one of the initial tripwire file and the subsequent tripwire file failed to enable detection of a security threat, and (4) adjusting automatic generation of a third tripwire file based on the automated feedback indicating whether at least one of the initial tripwire file and the subsequent tripwire file failed to detect the security threat. Various other methods, systems, and computer-readable media are also disclosed.

20 Claims, 7 Drawing Sheets

(58) Field of Classification Search
CPC ............. H04L 63/1408; H04L 63/1416; H04L 63/1441; H04L 63/1491
See application file for complete search history.

(56) References Cited

U.S. PATENT DOCUMENTS

| | | | |
|---|---|---|---|
| 2012/0084866 A1* | 4/2012 | Stolfo ................... | G06F 21/554 726/25 |
| 2013/0145465 A1* | 6/2013 | Wang ................... | G06F 21/552 726/23 |
| 2014/0129449 A1 | 5/2014 | Cohen, Jr. et al. | |
| 2016/0012222 A1 | 1/2016 | Stolfo et al. | |
| 2016/0180087 A1* | 6/2016 | Edwards ............... | G06F 21/566 726/24 |
| 2016/0323301 A1* | 11/2016 | Boss ................... | H04L 63/1416 |

* cited by examiner

SYSTEMS AND METHODS FOR GENERATING TRIPWIRE FILES

BACKGROUND

Individuals and organizations typically seek to protect their computing resources from corresponding security threats. For example, enterprise organizations may install client-side antivirus products on their computing devices to protect the devices from these security threats. Similarly, enterprise organizations may install a gateway-side firewall to filter unwanted network traffic from entering the organizations' computing networks.

The attackers who generate security threats for computing resources are becoming increasingly sophisticated and aggressive. For example, some attackers have developed a new type of security threat named ransomware. Ransomware may lock one or more computing resources from a user while demanding that the user perform some task, such as paying a fee, in exchange for releasing the computing resources from the lock. For example, ransomware may lock one or more of the backup files that a user backs up to a cloud-based storage system until the user pays the corresponding ransom fee. Traditional security mechanisms, such as conventional antivirus products and firewall products, may not be optimized for protecting users from new security threats, including ransomware, as outlined above. Accordingly, the instant disclosure identifies and addresses a need for additional and improved systems and methods for protecting users from ransomware and other security threats.

SUMMARY

As will be described in greater detail below, the instant disclosure generally relates to systems and methods for generating tripwire files by, for example, creating different polymorphic versions of an algorithm for generating tripwire files, generating corresponding tripwire files using each respective polymorphic version of the algorithm, evaluating the performance of the various tripwire files in a controlled simulation environment and/or in the field, and/or adjusting one or more versions of the algorithm for generating future tripwire files based on automatic feedback received based on the evaluation of the performance of the previous set of tripwire files, as discussed further below. In one example, a computer-implemented method for generating tripwire files may include (1) generating an initial tripwire file according to an initial tripwire generation calculation, the initial tripwire file configured such that modification of the initial tripwire file triggers investigation of a security breach, (2) generating a subsequent tripwire file according to a subsequent tripwire generation calculation, the subsequent tripwire generation calculation differing from the initial tripwire generation calculation along at least one dimension, (3) receiving automated feedback that indicates whether at least one of the initial tripwire file and the subsequent tripwire file failed to enable detection of a security threat, and (4) adjusting automatic generation of a third tripwire file based on the automated feedback indicating whether at least one of the initial tripwire file and the subsequent tripwire file failed to detect the security threat.

In one embodiment, the security threat may include a ransomware exploit. In a further embodiment, the dimension along which the subsequent tripwire generation calculation differs from the initial tripwire generation calculation may include (1) a naming convention for naming a corresponding tripwire file, (2) a size of the corresponding tripwire file, (3) a file format for the corresponding tripwire file, and/or (4) an algorithm for generating the corresponding tripwire file from an item of underlying content.

In some examples, receiving automated feedback that indicates whether at least one of the initial tripwire file and the subsequent tripwire file failed to enable detection of a security threat may include checking, during a backup operation, whether a fingerprint of a corresponding tripwire file on a client device differs from a previously calculated fingerprint of the same tripwire file stored on a backup server. In some examples, checking whether the fingerprint of the corresponding tripwire file on the client device differs from the previously calculated fingerprint of the same tripwire file stored on the backup server may include determining that the fingerprint of the corresponding tripwire file on the client device does not differ from the previously calculated fingerprint of the same tripwire file stored on the backup server. Additionally, the computer-implemented method may further include detecting the security threat at the client device and determining that the corresponding tripwire file failed to enable detection of the security threat.

In further examples, checking whether the fingerprint of the corresponding tripwire file on the client device differs from the previously calculated fingerprint of the same tripwire file stored on the backup server may include determining that the fingerprint of the corresponding tripwire file on the client device does differ from the previously calculated fingerprint of the same tripwire file stored on the backup server. In one embodiment, the computer-implemented method may further include (1) checking, in response to determining that the fingerprint of the corresponding tripwire file on the client device does differ from the previously calculated fingerprint of the same tripwire file stored on the backup server, for the presence of the security threat at the client device, (2) detecting the security threat at the client device, and (3) determining that the corresponding tripwire file enabled detection of the security threat.

In some examples, detecting the security threat at the client device may include prompting a user at the client device to confirm the presence of the security threat at the client device. In further examples, receiving automated feedback that indicates whether at least one of the initial tripwire file and the subsequent tripwire file failed to enable detection of a security threat may include evaluating performance of at least one of the initial tripwire file and the subsequent tripwire file in enabling detection of security threats within a controlled simulation environment at a security vendor server.

In one embodiment, a system for implementing the above-described method may include (1) a generation module, stored in memory, that (A) generates an initial tripwire file according to an initial tripwire generation calculation, the initial tripwire file configured such that modification of the initial tripwire file triggers investigation of a security breach and (B) generates a subsequent tripwire file according to a subsequent tripwire generation calculation, the subsequent tripwire generation calculation differing from the initial tripwire generation calculation along at least one dimension, (2) a reception module, stored in memory, that receives automated feedback that indicates whether at least one of the initial tripwire file and the subsequent tripwire file failed to enable detection of a security threat, (3) an adjustment module, stored in memory, that adjusts automatic generation of a third tripwire file based on the automated feedback indicating whether at least one of the initial tripwire file and the subsequent tripwire file failed to detect the security threat, and (4) at least one physical processor configured to execute the generation module, the reception module, and the adjustment module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) generate an initial tripwire file according to an initial tripwire generation calculation, the initial tripwire file configured such that modification of the initial tripwire file triggers investigation of a security breach, (2) generate a subsequent tripwire file according to a subsequent tripwire generation calculation, the subsequent tripwire generation calculation differing from the initial tripwire generation calculation along at least one dimension, (3) receive automated feedback that indicates whether at least one of the initial tripwire file and the subsequent tripwire file failed to enable detection of a security threat, and (4) adjust automatic generation of a third tripwire file based on the automated feedback indicating whether at least one of the initial tripwire file and the subsequent tripwire file failed to detect the security threat.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
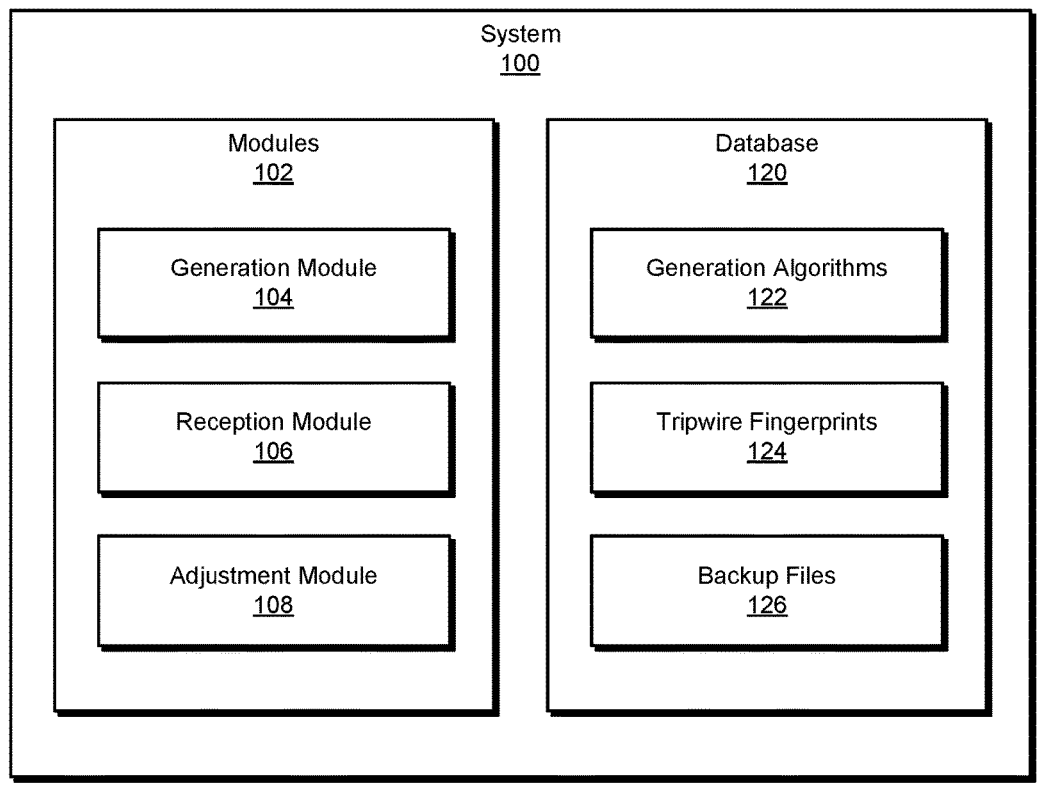
FIG. 1 is a block diagram of an exemplary system for generating tripwire files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for generating tripwire files. As will be explained in greater detail below, the disclosed systems and methods may involve a process of polymorphic evolution to identify attributes and algorithms for generating tripwire files that are superior to other attributes and algorithms. By iteratively selecting attributes and algorithms that result in superior performance, the disclosed systems and methods may gradually improve the general performance and generation of tripwire files and more effectively detect corresponding security threats.

Figure 2:
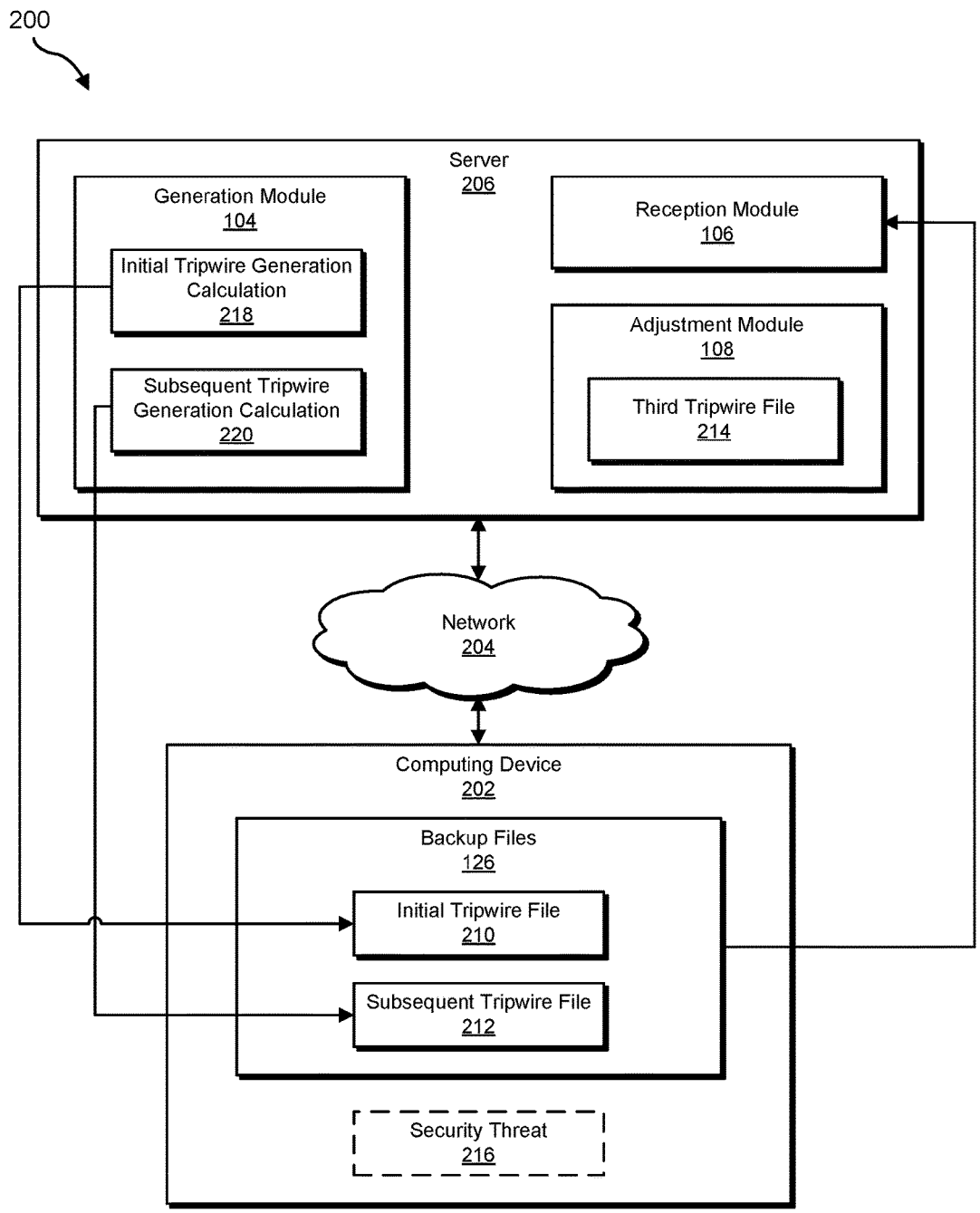
FIG. 2 is a block diagram of an additional exemplary system for generating tripwire files.

The following will provide, with reference to FIGS. 1-2, detailed descriptions of exemplary systems for generating tripwire files. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for generating tripwire files. As illustrated in this figure, exemplary system 100 may include one or more modules 102 for performing one or more tasks. For example, and as will be explained in greater detail below, exemplary system 100 may also include a generation module 104 that may generate an initial tripwire file according to an initial tripwire generation calculation. The initial tripwire file may be configured such that modification of the initial tripwire file triggers investigation of a security breach. Generation module 104 may also generate a subsequent tripwire file according to a subsequent tripwire generation calculation. The subsequent tripwire generation calculation may differ from the initial tripwire generation calculation along one or more dimensions.

Exemplary system 100 may additionally include a reception module 106 that may receive automated feedback that indicates whether at least one of the initial tripwire file and the subsequent tripwire file failed to enable detection of a security threat. Exemplary system 100 may further include an adjustment module 108 that may adjust automatic generation of a third tripwire file based on the automated feedback indicating whether at least one of the initial tripwire file and the subsequent tripwire file failed to detect the security threat. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store generation algorithms 122, which may correspond to various polymorphic versions of generation algorithms for generating tripwire files. The various polymorphic versions of the generation algorithms may each differ along one or more dimensions (e.g., differ randomly or quasi-randomly), thereby enabling polymorphic evolution and improvement of generation algorithms for generating tripwire files, as discussed further below. Database 120 may also be configured to store tripwire fingerprints 124. As used herein, the term "fingerprint" generally refers to any item of data that uniquely identifies the exact content of a corresponding file such that a difference in the fingerprint between two files indicates a difference in their underlying content. In general, fingerprints tend to be smaller than their corresponding files. In one exemplary embodiment, the fingerprint corresponds to a hash. Additionally, database 120 may be configured to store backup files 126, which may correspond to files that are configured for automatic and regular backing up to a backup server, such as a cloud-based storage server provided by a storage vendor. In exemplary embodiments, the disclosed systems and methods may operate in the context of automated backup procedures, as discussed further below.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to generate tripwire files. For example, and as will be described in greater detail below, generation module 104 may generate an initial tripwire file 210 according to an initial tripwire generation calculation 218. Initial tripwire file 210 may be configured such that modification of initial tripwire file 210 triggers investigation of a security breach. Generation module 104 may also generate a subsequent tripwire file 212 according to a subsequent tripwire generation calculation 220. Subsequent tripwire generation calculation 220 may differ from initial tripwire generation calculation 218 along at least one dimension. Reception module 106 may receive automated feedback that indicates whether at least one of initial tripwire file 210 and subsequent tripwire file 212 failed to enable detection of a security threat 216. Adjustment module 108 may adjust automatic generation of a third tripwire file 214 based on the automated feedback indicating whether at least one of initial tripwire file 210 and subsequent tripwire file 212 failed to detect security threat 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of facilitating the generation and/or management of tripwire files. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
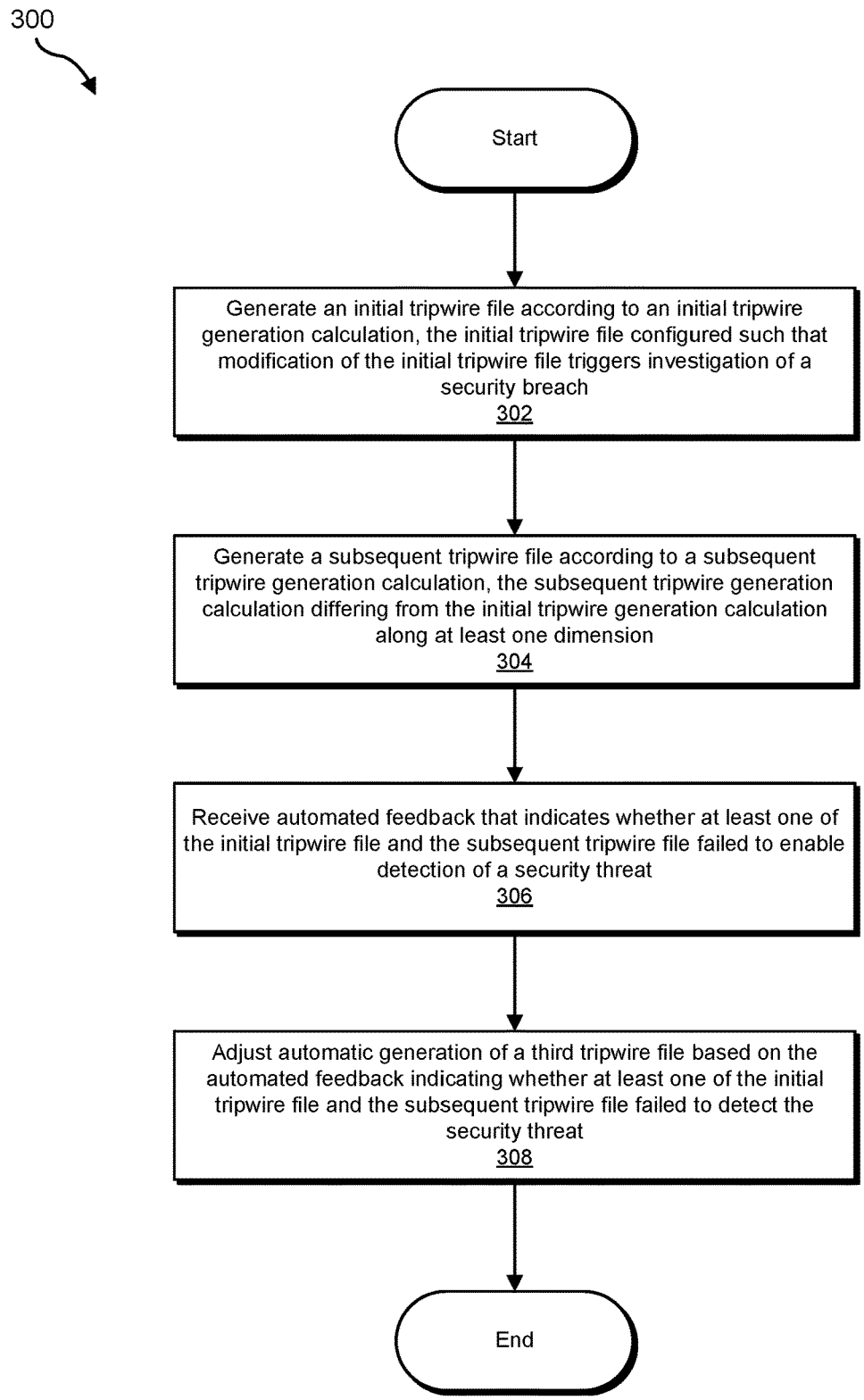
FIG. 3 is a flow diagram of an exemplary method for generating tripwire files.

FIG. 3 is a flow diagram of an exemplary computer-implemented method 300 for generating tripwire files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may generate an initial tripwire file according to an initial tripwire generation calculation. The initial tripwire file may be configured such that modification of the initial tripwire file triggers investigation of a security breach. For example, generation module 104 may, as part of server 206 in FIG. 2, generate initial tripwire file 210 according to initial tripwire generation calculation 218.

As used herein, the term "tripwire file" generally refers to a file that is configured, either through its internal configuration or through its placement within a larger security system context, such that modification of the tripwire file triggers investigation of a potential security breach. For example, a software security system may insert a tripwire file within a folder in a user's file system. The software security system may notify the user that the tripwire file is not intended to be modified. Additionally or alternatively, the software security system may configure the tripwire file such that the tripwire file name, extension, output, and/or underlying content (e.g., text or multimedia content) indicate that the file is not intended to be modified by the user. For example, the tripwire file may include a security vendor watermark and the watermark may include a warning for the user indicating that the user should not modify the file. Additionally or alternatively, the software security system may insert the file in an obscure or inconspicuous location, such as a newly generated folder within a larger folder for the corresponding software security product installed on the user's client device or for the client device's operating system. In general, the software security system may insert the file within a folder that is newly generated and/or unlikely to be accessed or modified by the user.

Subsequently, after generation and insertion of the tripwire file, the software security system may check whether the tripwire file has been modified, such as by checking whether a newly calculated fingerprint for the tripwire file matches a previously calculated fingerprint. As used herein, the phrase "the tripwire file has been modified" generally refers to the tripwire file contents having been altered, the tripwire file having been encrypted, and/or the tripwire file having been deleted. The software security system may perform this checking routinely or regularly, according to a predefined schedule, as part of an ongoing data backup operation. If the fingerprints do not match, then the tripwire file has been "tripped" and this may trigger the software security system to investigate a potential security breach, as discussed further below.

As used herein, the term "tripwire generation calculation" generally refers to any formula, algorithm, and/or calculation for generating tripwire files. Each tripwire generation calculation may specify: (1) one or more sources for obtaining underlying content used as a basis for generating the tripwire file, (2) one or more algorithms indicating how to modify one or more items of underlying content obtained from the sources, and/or (3) one or more destinations for inserting the generated tripwire file. The sources for obtaining underlying content may include fixed and/or random or quasi-random sources from a security vendor and/or on the user's client device, such as a same machine, disk, volume, parent folder, and/or folder as the destination for the tripwire file. The one or more algorithms indicating how to modify the one or more items of underlying content may further specify (1) a method for modifying one or more items of underlying content, (2) a filename convention for naming the resulting tripwire file, (3) a file format (e.g., a MICROSOFT WORD document or a PORTABLE DOCUMENT FORMAT document) for the resulting tripwire file, and/or (4) a size of the resulting tripwire file. The destinations for inserting the generated tripwire file may include a single or multiple destinations on a single client device and/or the same location or folder from which one or more items of underlying content were obtained, as discussed further above.

Generation module 104 may generate the initial tripwire file in a variety of ways. In general, generation module 104 may generate the initial tripwire file according to the initial tripwire generation calculation. The initial tripwire generation calculation may correspond to one of multiple polymorphic calculations or algorithms for generating tripwire files. The polymorphic calculations or algorithms may be polymorphic in the sense that one or more instructions, features, aspects, and/or attributes of the various polymorphic calculations may vary (e.g., randomly or semi-randomly), thereby enabling selection, evolution, and improvement of the performance and generation of tripwire files, as discussed further below.

At step 304, one or more of the systems described herein may generate a subsequent tripwire file according to a subsequent tripwire generation calculation. The subsequent tripwire generation calculation may differ from the initial tripwire generation calculation along at least one dimension. For example, generation module 104 may, as part of server 206 in FIG. 2, generate subsequent tripwire file 212 according to subsequent tripwire generation calculation 220.

As used herein, the phrase "differ from the initial tripwire generation calculation along at least one dimension" generally refers to the initial tripwire generation calculation and the subsequent tripwire generation calculation being two different polymorphic variants or versions of an underlying tripwire generation calculation such that these two different calculations generate corresponding tripwire files in different ways. For example, the different calculations may obtain underlying content for the resulting tripwire files from different sources, may modify the underlying content in different ways, may generate tripwire files having different sizes, may generate tripwire files having different file formats, may generate tripwire files having different file names or naming conventions, and/or may place or insert the resulting tripwire files in different folders or locations within corresponding client devices. In general, any rule, instruction, attribute, modification, value, and/or step of one polymorphic tripwire generation calculation variant may differ from another polymorphic tripwire generation calculation variant, according to a fixed, random, or quasi-random modification pattern. In further examples, generation module 104 may iterate between different values (e.g., random or quasi-random values) for one or more variables (e.g., source location, size, naming convention, file format, destination location, etc.) to systematically generate polymorphic variants of tripwire files (e.g., thereby performing a nested loop that loops between different values for each variable while looping between different variables used in tripwire generation calculations).

Moreover, as used herein, the term or adjective "polymorphic" generally refers to the generation of variant tripwire generation calculations such that these variant calculations differ along one or more dimensions, as discussed above, in an attempt to enable selection of calculations and corresponding tripwire files that perform best along one or more metrics, as well as corresponding evolution of the underlying tripwire generation calculation according to random or quasi-random mutation and selection. Accordingly, mutation, selection, and evolution of the tripwire generation calculation may improve the performance and generation of tripwire files, as discussed further below.

At step 306, one or more of the systems described herein may receive automated feedback that indicates whether at least one of the initial tripwire file and the subsequent tripwire file failed to enable detection of a security threat. For example, reception module 106 may, as part of server 206 in FIG. 2, receive automated feedback that indicates whether at least one of initial tripwire file 210 and subsequent tripwire file 212 failed to enable detection of security threat 216.

As used herein, the term "security threat" generally refers to any malware, exploit, intrusion, and/or other compromise of computing or network security. In one embodiment, the security threat may include a ransomware exploit. In general, the security threat of step 306 may correspond to the potential security breach of step 302.

As used herein, the phrase "enable detection of a security threat" generally refers to a tripwire file functioning, within the context of the overall security system in which the tripwire file has been placed, such that a change in the tripwire file triggers investigation of a potential security threat that leads to detection of an actual security threat, as discussed further below (e.g., a "true positive" result).

As used herein, the term "automated feedback" generally refers to feedback that a software security system automatically receives or collects in a process for deploying and evaluating tripwire files generated according to steps 302 and 304, as outlined above. For example, the software security system may regularly scan tripwire files to detect whether the tripwire files have changed (e.g., whether their fingerprints have changed). In parallel, the software security system, such as systems 100 and 200, may systematically or continuously monitor for detection of security threats, such as receiving indications of detected security threats detected by client-side antivirus and malware protection systems at corresponding enterprise client devices. Additionally, the software security system may trigger investigation of the potential security breach in response to detecting that one or more tripwire files has been modified.

In general, the software security system may evaluate the performance of a polymorphic tripwire generation calculation variant and the resulting tripwire file by checking whether (A) a tripwire file was detected as changed due to the actual presence of a security threat at the corresponding client device (i.e., a true positive), (B) a tripwire file did not change despite the actual presence of a security threat at the corresponding client device (i.e., a false negative), (C) a tripwire file did not change due to the actual absence of a security threat at the corresponding client device (i.e., a true negative), and/or (D) a tripwire file did change despite the actual absence of a security threat at the corresponding client device (i.e., a false positive due to a user or other entity modifying the tripwire file despite the user or other entity not constituting a security threat). In general, a true positive or a true negative may indicate a higher level of performance than a false positive or false negative. Accordingly, adjustment module 108 may adjust one or more tripwire generation calculations based on the received automated feedback, such as by adjusting a tripwire generation calculation to more closely resemble a tripwire generation calculation that resulted in a true positive or a true negative and/or adjusting the tripwire generation calculation to less resemble a tripwire generation calculation that resulted in a false positive or a false negative.

More generally, reception module 106 may evaluate polymorphic tripwire generation calculation variants based on a number or proportion of detected true positives, false positives, true negatives, and/or false negatives. Reception module 106 may receive these various indications, as automatic feedback, corresponding to a multitude of tripwire file variants and/or client devices (e.g., tens, hundreds, thousands, tens of thousands, and/or millions, or any other arbitrary number, of tripwire files that have been deployed to tens, hundreds, thousands, tens of thousands, and/or millions, or any other arbitrary number of client devices, where each client device receives one or more instances of one or more respective tripwire file variants).

For example, one tripwire generation calculation variant may be used to generate 10 different instances of the same tripwire file, which may be inserted within 10 different locations on the same client device. Similarly, a second tripwire generation calculation may be used to generate five different instances of a second tripwire file, which may be inserted within five different or overlapping locations on the same client device. In a similar manner, various same or different tripwire file variants, as either single copies or multiple copies, may be deployed to numerous other client devices across a network, region, nation, and/or the world. From each of these client devices, a server-side product or module, such as reception module 106, may systematically or continuously monitor for detections of true positives, false positives, true negatives, and/or false negatives. Reception module 106 may subsequently tally a number or proportion of these indications to further calculate or specify a performance score for the corresponding tripwire generation calculation variant (e.g., a decimal score along a 1 to 10 scale). Additionally or alternatively, some or all of the tripwire file variants may be evaluated in a controlled simulation environment managed by a corresponding security vendor rather than being evaluated in the field. After evaluating the performance of one or more tripwire generation calculation variants, adjustment module 108 may adjust a tripwire generation calculation to more closely resemble a tripwire generation calculation variant that performs better than another tripwire generation calculation variant, as further discussed above.

Figure 4:
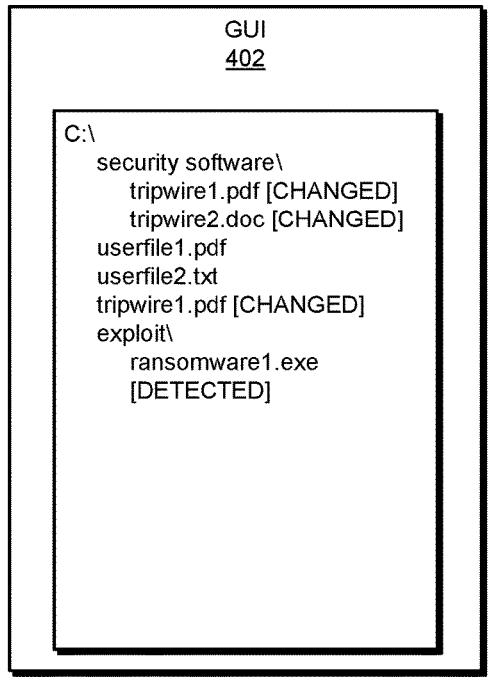
FIG. 4 is a block diagram of exemplary graphical user interfaces relating to embodiments of the systems and methods described herein.
Figure 4:
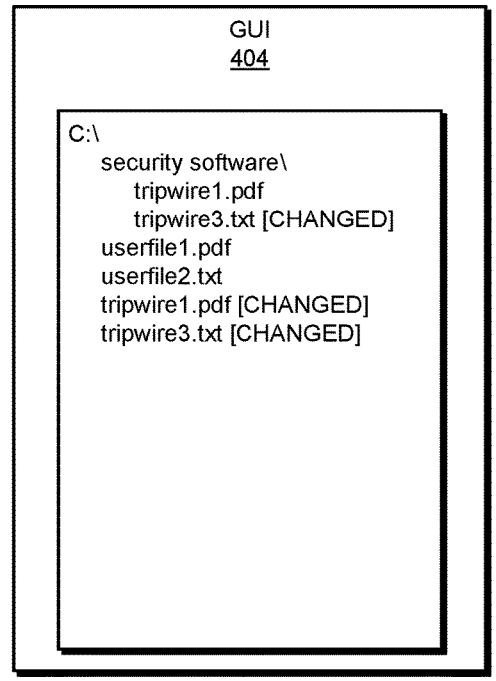
Figure 4:
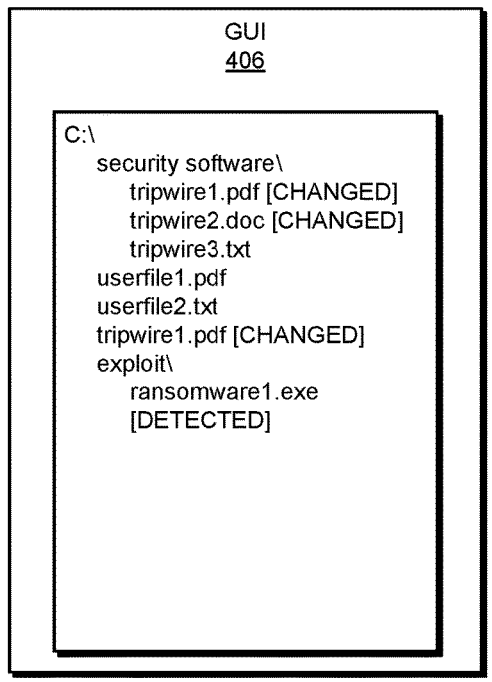
Figure 4:
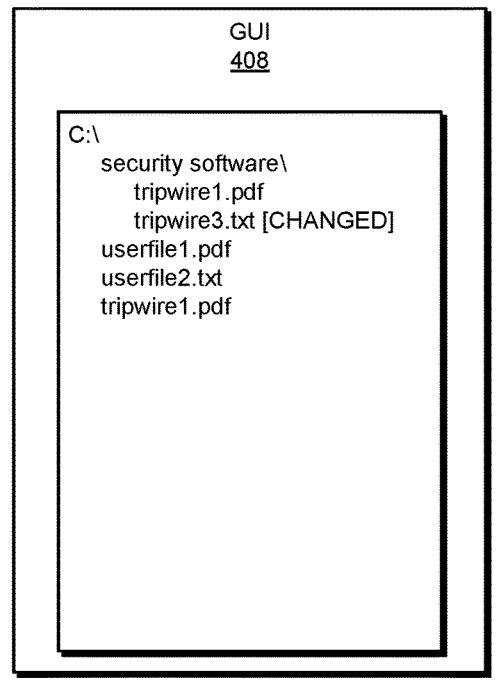

FIG. 4 provides an illustration of various tripwire file variants that correspond to helpful examples for further explaining the systems and methods disclosed herein. As shown in this figure, four different graphical user interfaces ("GUIs"), a GUI 402, a GUI 404, a GUI 406, and a GUI 408 may correspond to different client devices where instances of various tripwire file variants have been inserted to facilitate the detection of security threats. GUI 402 shows that two instances of a first tripwire file variant, tripwire1.pdf, have been inserted on this client device, as well as one instance of a second tripwire file variant, tripwire2.doc. Additionally, a ransomware exploit (i.e., ransomware1.exe) has been detected at this client device. All of the instances of the tripwire file variants at this client device have been detected as changed (e.g., reception module 106 has detected that their fingerprints have changed), thereby further indicating true positives.

GUI 404 shows that two instances of the first tripwire file variant and two instances of a third tripwire file variant, tripwire3.pdf, have been inserted at this client device. As shown in GUI 404, although no ransomware or other exploit is present at this computing device, one instance of the first tripwire file variant and two instances of the third tripwire file variant have been detected as changed, thereby indicating false positives. One instance of the first tripwire file variant has not changed, thereby indicating a true negative.

Furthermore, GUI 406 shows that two instances of the first tripwire file variant, one instance of the second tripwire file variant, and one instance of the third tripwire file variant have been inserted at this client device. Additionally, GUI 406 shows that the same ransomware1.exe has been detected at this client device. Furthermore, two instances of the first tripwire file variant and one instance of the second tripwire file variant have been detected as changed, thereby indicating true positives. The single instance of the third tripwire file variant has not changed, thereby indicating a false negative.

GUI 408 shows that two instances of the first tripwire file variant have been inserted at this client device, as well as one instance of the third tripwire file variant. Additionally, GUI 408 further shows that no ransomware or other exploit is present at this client device. The single instance of the third tripwire file variant has been detected as changed, thereby indicating a false positive. The remaining two instances of the first tripwire file variant have not changed, thereby indicating true negatives.

More generally, reception module 106 may receive automated feedback that indicates whether at least one of the initial tripwire file (e.g., tripwire1.pdf) and the subsequent tripwire file (e.g., tripwire3.txt) failed to enable detection of a security threat by checking, during a backup operation, whether a fingerprint of a corresponding tripwire file on a client device (e.g., tripwire1.pdf and/or tripwire3.pdf) differs from a previously calculated fingerprint of the same tripwire file stored on a backup server. As shown in FIG. 4, reception module 106 may check whether one or more tripwire file variants has changed. Reception module 106 may check whether one or more of the tripwire file variants has changed either (1) in response to detecting the presence of a security threat (e.g., ransomware1.exe) and/or (2) preemptively, systematically, and/or continuously according to a software security schedule or a data backup schedule.

Notably, detection of a security threat may trigger checking whether a corresponding tripwire file changed and vice versa (i.e., detection of a change in a tripwire file may trigger checking, through a user prompt or through a client-side antivirus product, whether a security threat is present at the client device). Thus, obtaining one item of information (e.g., whether a security threat is present) may trigger the obtaining of another item of information (e.g., whether a tripwire file changed), and vice versa, thereby enabling reception module 106 to determine whether these two items of information indicate a true positive, false positive, true negative, and/or false-negative. Additionally, in some examples, detection of a full restore procedure may trigger an investigation that leads to confirmation of a security threat, such as a ransomware attack. Whenever a user attempts to execute a full restore from an existing backup, reception module 106 may optionally check (e.g., either server-side and/or client-side) whether the user is restoring to the same machine and/or same disk. If that is the case, then the user is likely a victim of an exploit, such as a ransomware attack. Reception module 106 may then initiate a secure investigation to check whether the restore is due to an exploit (e.g., a ransomware attack), such as by prompting the user for confirmation and/or running an antivirus scan, which may indicate a false negative. Moreover, in some examples, reception module 106 may not consider true negatives, because there is no corresponding security event (e.g., detection of a security threat or detection of a changed tripwire file) to trigger calculation of the true negative.

In further examples, reception module 106 may check whether the fingerprint of the corresponding tripwire file on the client device differs from the previously calculated fingerprint of the same tripwire file stored on the backup server by determining that the fingerprint of the corresponding tripwire file on the client device does not differ from the previously calculated fingerprint of the same tripwire file stored on the backup server (i.e., the fingerprint is stored on the server). For example, reception module 106 may determine that one instance of tripwire1.pdf did not change at GUI 404, that one instance of tripwire3.txt did not change at GUI 406, and that both instances of tripwire1.pdf did not change at GUI 408.

In further embodiments, reception module 106 may (1) detect the security threat at the client device and (2) determine that the corresponding tripwire file failed to enable detection of the security threat. For example, reception module 106 may detect the security threat at GUI 406 (i.e., ransomware1.exe) and also determine that tripwire3.txt did not change, thereby indicating a false negative.

In other examples, reception module 106 may determine that the fingerprint of the corresponding tripwire file on the client device does differ from the previously calculated fingerprint of the same tripwire file stored on the backup server. For example, reception module 106 may determine that instances of tripwire file variants have changed, as shown by the instances of the "[CHANGED]" marker in GUI 402, GUI 404, GUI 406, and GUI 408. In further examples, reception module 106 may check, in response to determining that the fingerprint of the corresponding tripwire file on the client device does differ from the previously calculated fingerprint of the same tripwire file stored on the backup server, for the presence of the security threat at the client device. For example, in response to detecting that a tripwire file variant (e.g., tripwire1.pdf) has changed at GUI 402, reception module 106 may investigate whether a security threat is present at the client device. For example, reception module 106 may prompt a user at the client device (e.g., through a phone call, text message, email, and/or security product alert at the same or different client device) to verify the presence of a security threat, exploit, and/or malware at the client device. Additionally or alternatively, reception module 106 may trigger a software security scan, such as a virus scan performed by an antivirus or anti-malware product, which may further detect the security threat at the client device. Upon detecting the security threat at the client device (e.g., ransomware1.exe at GUI 402), reception module 106 may determine that the corresponding tripwire file (e.g., tripwire1.pdf or tripwire2.doc) enabled detection of the security threat, thereby indicating a true positive.

Figure 5:
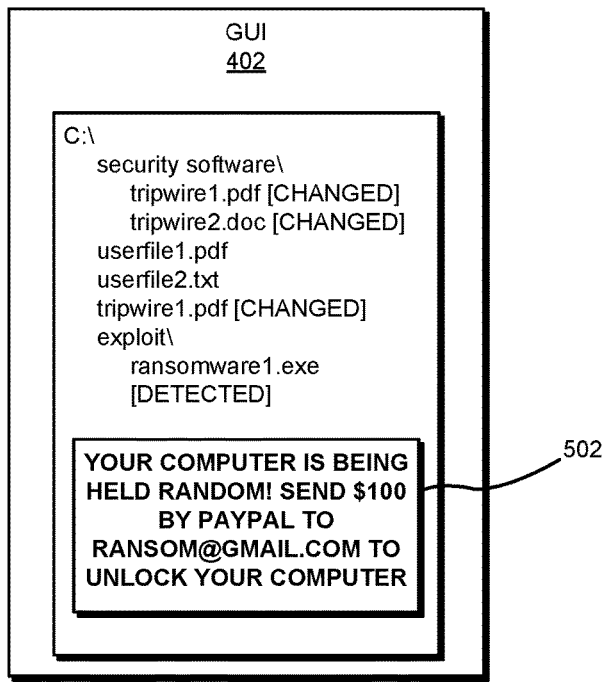
FIG. 5 is a block diagram of exemplary graphical user interfaces relating to embodiments of the systems and methods described herein.
Figure 5:
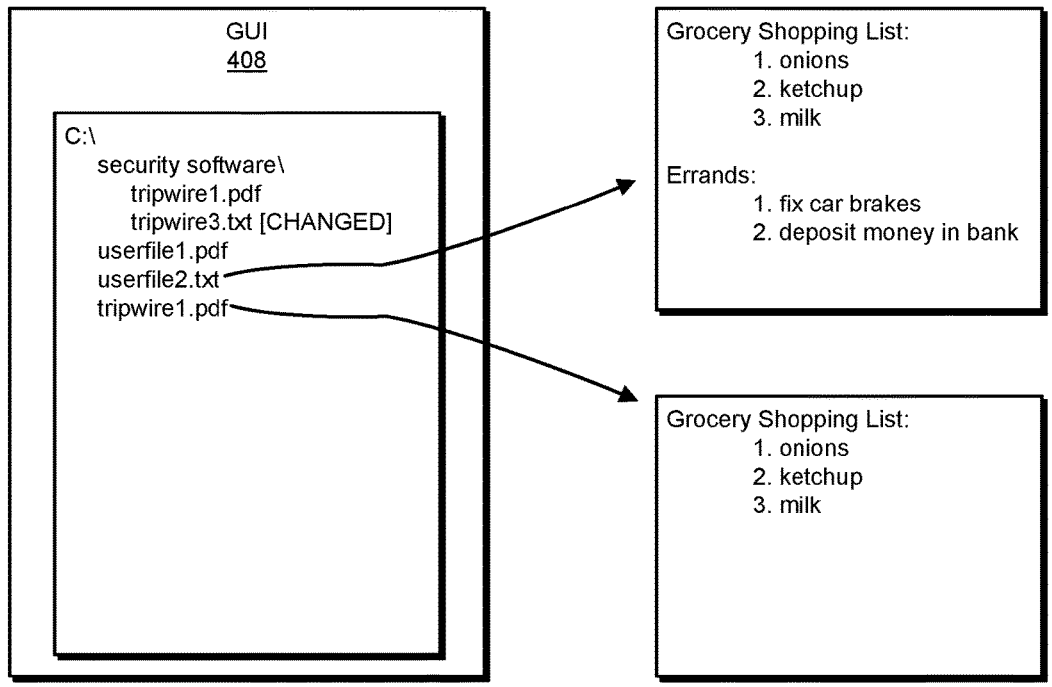

Notably, FIG. 5 shows further details of GUI 402 and GUI 408. In this example, GUI 402 may further include a pop-up window 502, which further includes the text of a ransom demand from ransomware1.exe. As further shown in this figure, the text states "YOUR COMPUTER IS BEING HELD RANSOM! SEND $100 BY PAYPAL TO RANSOM@GMAIL.COM TO UNLOCK YOUR COMPUTER[.]" Additionally, FIG. 5 further shows the content of two files that are listed in GUI 408, userfile2.txt and tripwire1.pdf. In this example, tripwire1.pdf may be generated by generation module 104 using userfile2.txt as underlying content. Specifically, generation module 104 may excerpt a first portion of userfile2.txt into a second text document and then convert that text document into PORTABLE DOCUMENT FORMAT to thereby generate tripwire1.pdf, the contents of which are further shown in this figure.

In some examples, generation module 104 may generate a tripwire file in a manner that maximizes the disguise of the tripwire file as an ordinary, non-tripwire file. For example, generation module 104 may not include any warning within the tripwire file contents or metadata indicating that the user should not modify the tripwire file. In some examples, generation module 104 may not even put an indication that the file is a tripwire file in the file name (e.g., generation module 104 may name the file "grocery list.pdf" instead of "tripwire1.pdf"). In other examples, generation module 104 may optionally insert one or more indications that the file is a tripwire file within the tripwire file contents and/or metadata.

At step 308, one or more of the systems described herein may adjust automatic generation of a third tripwire file based on the automated feedback indicating whether at least one of the initial tripwire file and the subsequent tripwire file failed to detect the security threat. For example, adjustment module 108 may, as part of server 206 in FIG. 2, adjust automatic generation of third tripwire file 214 based on the automated feedback indicating whether at least one of initial tripwire file 210 and subsequent tripwire file 212 failed to detect security threat 216.

In general, adjustment module 108 may adjust the generation of the third tripwire file such that the third tripwire file is generated in a manner that more closely resembles a tripwire generation calculation that performed better than another tripwire generation calculation along one or more performance metrics. These performance metrics may include a higher rank along a second, underlying performance metric, a higher number of proportion of true positives and/or true negatives, and/or a lower number or proportion of false positives and/or false negatives. For example, reception module 106 and/or adjustment module 108 may evaluate a multitude of different tripwire generation calculations using one or more heuristics, which may be based on received indications of true positives, true negatives, false positives, and/or false negatives, to thereby generate a resulting performance metric score (e.g., a decimal score along a 1 to 10 scale). Adjustment module 108 may then select one or more tripwire generation calculations that satisfied one or more defined thresholds (e.g., top 20% of evaluated calculations according to performance metric score, true positives/false positives greater than 2.0, etc.).

In general, adjustment module 108 may use any one or more of the following as inputs to an overall evaluation calculation for evaluating the performance of a tripwire generation calculation: (1) a rank of the calculation amongst other ranks according to an underlying performance metric score, (2) a number of true positives, (3) a number of false positives, (4) a number of true negatives, and/or (5) a number of false negatives. More generally, adjustment module 108 may implement or facilitate the mutation, selection, and evolution of tripwire generation calculation attributes by identifying which attributes performed better than other attributes and then promoting those superior attributes in a subsequent generation or batch of newly created tripwire files, as further discussed above.

In the example of FIG. 4, the tripwire generation calculation that produced tripwire3.txt is clearly inferior to the others, because tripwire3.txt resulted in false positives (at GUI 404 and GUI 408) and a false negative (at GUI 406). Of the remaining two tripwire files, tripwire1.pdf arguably performed slightly worse than tripwire2.doc, because tripwire1.pdf produced a false positive (at GUI 404). Nevertheless the number of deployed instances of tripwire1.pdf differs from the number of deployed instances of tripwire2.doc, and this fact may alter or affect the resulting ranking and performing metrics. More generally, different heuristics for evaluating the performance of tripwire files may result in different rankings and/or performance scores.

As explained above in connection with method 300 in FIG. 3, the disclosed systems and methods may involve a process of polymorphic evolution to identify attributes and algorithms for generating tripwire files that are superior to other attributes and algorithms. By iteratively selecting attributes and algorithms that result in superior performance, the disclosed systems and methods may gradually improve the general performance and generation of tripwire files and more effectively detect corresponding security threats.

The following provides a more concrete explanation of embodiments of the disclosed systems and methods. Ransomware attacks have risen dramatically over the past couple of years. The attacks range from simply locking a user out of the device to encrypting the user's entire disk. Crypto-lock is a form of ransomware that encrypts a user's file system and demands a ransom in exchange for the decryption key. The encryption algorithm has become more sophisticated in recent attacks and there is no simple way of decrypting a user's files without the decryption key.

Tripwire files placed in strategic locations can be used to detect a crypto-lock attack if any of the tripwire files were tempered with (e.g., modified, deleted, or encrypted). However if these tripwire files are not generated correctly (static content, too small, following a naming pattern, etc.), they can be easily detected and bypassed by the ransomware exploits. The ransomware exploits continue to evolve and the authors of these exploits are looking for ways for the exploits to go undetected. The challenge is to generate effective tripwire files so that the tripwire files cannot be detected and bypassed by ransomware exploits.

The disclosed systems and methods address the problem of generating effective tripwire files to detect crypto-lock attacks through crowd sourcing and predictive analysis. Effective tripwire files appear to be normal files in the eyes of ransomware so they will not be bypassed during a crypto-lock attack. Initially, tripwire files may be randomly generated based on the content in each folder (e.g., each folder backed up by a backup system), varying in algorithms and other file attributes like file size and file names. Each generated tripwire file and generation algorithm may be further stored in the cloud along with information about the endpoint computing device. For example, each of the following may correspond to a variant algorithm for generating a tripwire file: (1) inserting a static security vendor logo image file as the tripwire file, (2) selecting a random picture from a library of images, (3) randomly cropping a small portion of a user's existing image at a specified location, (4) selecting an existing image from a current directory and adding a security vendor logo watermark to the image, and/or (5) creating a small video based on a user's specified video by randomly selecting a clip and adding a security vendor logo watermark. All of these generated tripwire files may be uploaded to a cloud based simulation environment and tested against known ransomware exploits for their effectiveness. The result may be fed into the predictive model to refine future tripwire generation algorithms.

Additionally, the disclosed systems and methods may collect statistics on the effectiveness of these tripwire files during the backup process. When a potential crypto-lock attack is identified, the user's backup process may be stopped and the user may be alerted by a software security product. The user may then be prompted to confirm the presence of the security threat or instead confirm a false positive. For example, the user may be presented with all of the modified files (e.g., all of the modified files for that day) and then confirm that the user modified these rather than a security threat, such as a ransomware exploit. The client device may report both true positives and false positives to the security vendor backend server, along with information identifying the endpoint that triggered the identification.

When a user is crypto-locked (e.g., because the tripwire files were in effective) and needs to recover from the crypto-lock attack by restoring from the most recent unaffected backups, the backup client can ask the user to confirm that the restore is the result of a recent crypto-lock attack. The information about the ineffective tripwire files may be transmitted to the security vendor backend server, as well as information identifying the relevant endpoint. Based on automatically received feedback for effective and ineffective tripwire files and their generation algorithms, the disclosed systems and methods can refine the predictive model to identify the most effective file types and their corresponding algorithms to generate the most effective tripwire files to place on the user's client device. As one illustrative example, the model can determine that the most effective file type is a MICROSOFT WORD document and the most effective method for generating tripwire files is to take an existing WORD document and make a copy of it while adding a watermark. The disclosed systems and methods may continue to evolve the generation of tripwire files based on the details gained from client devices in the field, thereby effectively crowdsourcing the mutation, selection, and evolution of tripwire generation calculations to improve the performance of tripwire files.

Figure 6:
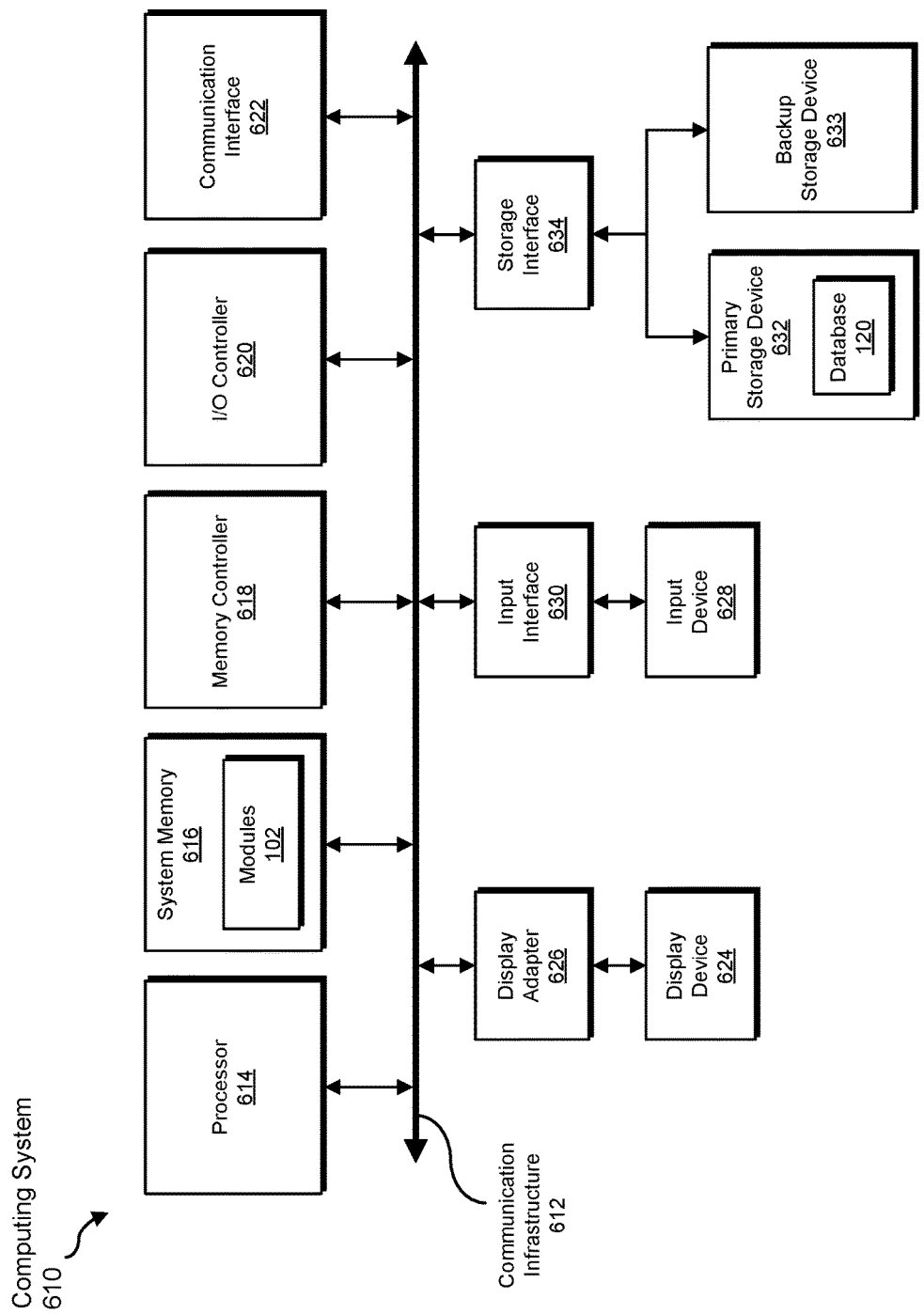
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
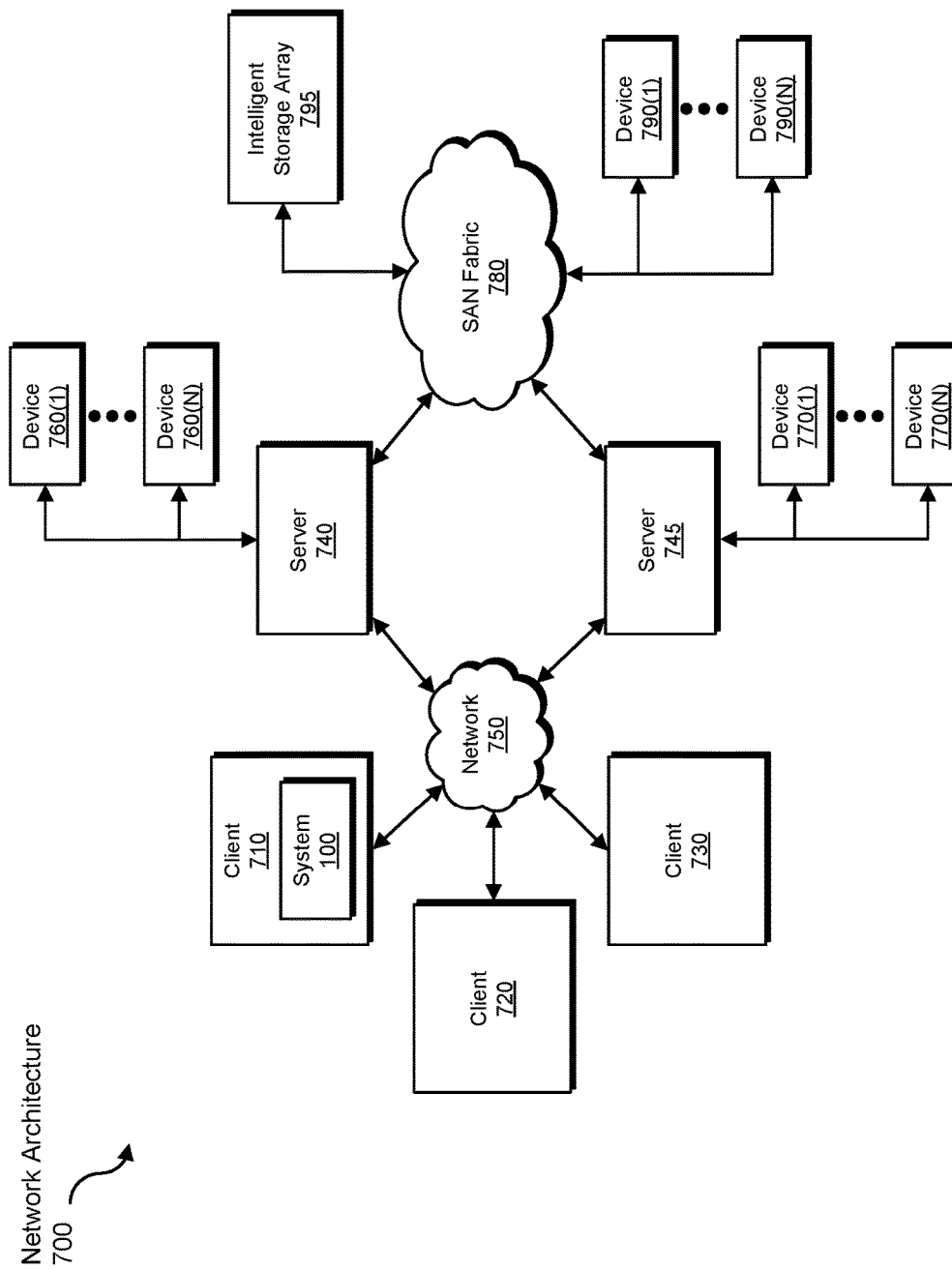
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for generating tripwire files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for generating tripwire files, at least a portion of the method being performed by a computing device comprising at least one processor, the method comprising:
    generating an initial tripwire file according to an initial variant of a tripwire generation algorithm, the initial tripwire file configured such that modification of the initial tripwire file triggers investigation of a security breach;
    generating a subsequent tripwire file according to a subsequent variant of the tripwire generation algorithm, the subsequent variant of the tripwire generation algorithm randomly differing from the initial variant of the tripwire generation algorithm along at least one dimension;
    receiving automated feedback that indicates whether at least one of the initial tripwire file and the subsequent tripwire file failed to enable detection of a security threat at least in part by:
        a backup client receiving an indication from a user to perform a restoration operation; and
        the backup client asking the user, in response to receiving the indication from the user to perform the restoration operation, whether the restoration operation is a result of a recent crypto-lock attack; and
    adjusting automatic generation of a third tripwire file based on the automated feedback indicating whether at least one of the initial tripwire file and the subsequent tripwire file failed to detect the security threat at least in part by selecting which variant of the tripwire generation algorithm was more effective in protecting against known ransomware exploits.

2. The computer-implemented method of claim 1, wherein the initial variant of the tripwire generation algorithm and the subsequent variant of the tripwire generation algorithm are polymorphic.

3. The computer-implemented method of claim 1, wherein the dimension along which the subsequent variant of the tripwire generation algorithm differs from the initial variant of the tripwire generation algorithm comprises at least one of:
    a naming convention for naming a corresponding tripwire file;
    a size of the corresponding tripwire file; and
    a file format for the corresponding tripwire file.

4. The computer-implemented method of claim 1, wherein receiving automated feedback that indicates whether at least one of the initial tripwire file and the subsequent tripwire file failed to enable detection of the security threat comprises checking, during a backup operation, whether a fingerprint of a corresponding tripwire file on a client device differs from a previously calculated fingerprint of the same tripwire file stored on a backup server.

5. The computer-implemented method of claim 4, wherein checking whether the fingerprint of the corresponding tripwire file on the client device differs from the previously calculated fingerprint of the same tripwire file stored on the backup server comprises determining that the fingerprint of the corresponding tripwire file on the client device does not differ from the previously calculated fingerprint of the same tripwire file stored on the backup server.

6. The computer-implemented method of claim 5, further comprising:
    detecting the security threat at the client device; and
    determining that the corresponding tripwire file failed to enable detection of the security threat.

7. The computer-implemented method of claim 4, wherein checking whether the fingerprint of the corresponding tripwire file on the client device differs from the previously calculated fingerprint of the same tripwire file stored on the backup server comprises determining that the fingerprint of the corresponding tripwire file on the client device does differ from the previously calculated fingerprint of the same tripwire file stored on the backup server.

8. The computer-implemented method of claim 7, further comprising:
    checking, in response to determining that the fingerprint of the corresponding tripwire file on the client device does differ from the previously calculated fingerprint of the same tripwire file stored on the backup server, for the presence of the security threat at the client device;
    detecting the security threat at the client device; and determining that the corresponding tripwire file enabled detection of the security threat.

9. The computer-implemented method of claim 8, wherein detecting the security threat at the client device comprises prompting the user at the client device to confirm the presence of the security threat at the client device.

10. The computer-implemented method of claim 1, wherein generating the initial tripwire file and the subsequent tripwire file comprises performing a nested loop that loops between different values for each variable while looping between different variables used in the tripwire generation algorithm.

11. A system for generating tripwire files, the system comprising:
a generation module, stored in memory, that:
generates an initial tripwire file according to an initial variant of a tripwire generation algorithm, the initial tripwire file configured such that modification of the initial tripwire file triggers investigation of a security breach; and
generates a subsequent tripwire file according to a subsequent variant of the tripwire generation algorithm, the subsequent variant of the tripwire generation algorithm randomly differing from the initial variant of the tripwire generation algorithm along at least one dimension;
a reception module, stored in memory, that receives automated feedback that indicates whether at least one of the initial tripwire file and the subsequent tripwire file failed to enable detection of a security threat at least in part by:
a backup client receiving an indication from a user to perform a restoration operation; and
the backup client asking the user, in response to receiving the indication from the user to perform the restoration operation, whether the restoration operation is a result of a recent crypto-lock attack; and
an adjustment module, stored in memory, that adjusts automatic generation of a third tripwire file based on the automated feedback indicating whether at least one of the initial tripwire file and the subsequent tripwire file failed to detect the security threat at least in part by selecting which variant of the tripwire generation algorithm was more effective in protecting against known ransomware exploits; and
at least one physical processor configured to execute the generation module, the reception module, and the adjustment module.

12. The system of claim 11, wherein the initial variant of the tripwire generation algorithm and the subsequent variant of the tripwire generation algorithm are polymorphic.

13. The system of claim 11, wherein the dimension along which the subsequent variant of the tripwire generation algorithm differs from the initial variant of the tripwire generation algorithm comprises at least one of:
a naming convention for naming a corresponding tripwire file;
a size of the corresponding tripwire file; and
a file format for the corresponding tripwire file.

14. The system of claim 11, wherein the reception module receives automated feedback that indicates whether at least one of the initial tripwire file and the subsequent tripwire file failed to enable detection of the security threat by checking, during a backup operation, whether a fingerprint of a corresponding tripwire file on a client device differs from a previously calculated fingerprint of the same tripwire file stored on a backup server.

15. The system of claim 14, wherein the reception module checks whether the fingerprint of the corresponding tripwire file on the client device differs from the previously calculated fingerprint of the same tripwire file stored on the backup server by determining that the fingerprint of the corresponding tripwire file on the client device does not differ from the previously calculated fingerprint of the same tripwire file stored on the backup server.

16. The system of claim 15, wherein the reception module further:
detects the security threat at the client device; and
determines that the corresponding tripwire file failed to enable detection of the security threat.

17. The system of claim 14, wherein the reception module checks whether the fingerprint of the corresponding tripwire file on the client device differs from the previously calculated fingerprint of the same tripwire file stored on the backup server by determining that the fingerprint of the corresponding tripwire file on the client device does differ from the previously calculated fingerprint of the same tripwire file stored on the backup server.

18. The system of claim 17, wherein the reception module:
checks, in response to determining that the fingerprint of the corresponding tripwire file on the client device does differ from the previously calculated fingerprint of the same tripwire file stored on the backup server, for the presence of the security threat at the client device;
detects the security threat at the client device; and
determines that the corresponding tripwire file enabled detection of the security threat.

19. The system of claim 18, wherein the reception module detects the security threat at the client device by prompting the user at the client device to confirm the presence of the security threat at the client device.

20. A non-transitory computer-readable medium comprising one or more computer-readable instructions that, when executed by at least one processor of a computing device, cause the computing device to:
generate an initial tripwire file according to an initial variant of a tripwire generation algorithm, the initial tripwire file configured such that modification of the initial tripwire file triggers investigation of a security breach;
generate a subsequent tripwire file according to a subsequent variant of the tripwire generation algorithm, the subsequent variant of the tripwire generation algorithm randomly differing from the initial variant of the tripwire generation algorithm along at least one dimension;
receive automated feedback that indicates whether at least one of the initial tripwire file and the subsequent tripwire file failed to enable detection of a security threat at least in part by:
a backup client receiving an indication from a user to perform a restoration operation; and
the backup client asking the user, in response to receiving the indication from the user to perform the restoration operation, whether the restoration operation is a result of a recent crypto-lock attack; and
adjust automatic generation of a third tripwire file based on the automated feedback indicating whether at least one of the initial tripwire file and the subsequent tripwire file failed to detect the security threat at least in part by selecting which variant of the tripwire generation algorithm was more effective in protecting against known ransomware exploits.

* * * * *